US012217232B2

(12) United States Patent
Wu et al.

(10) Patent No.: US 12,217,232 B2
(45) Date of Patent: Feb. 4, 2025

(54) ANONYMITY AND TRACEABILITY OF DIGITAL PROPERTY TRANSACTIONS ON A DISTRIBUTED TRANSACTION CONSENSUS NETWORK

(71) Applicant: TBCASOFT, INC., Sunnyvale, CA (US)

(72) Inventors: William Wu, Sunnyvale, CA (US);
Brian Chan, Sunnyvale, CA (US);
Chiahsin Li, Sunnyvale, CA (US); See Neng Foo, Sunnyvale, CA (US); Ling Wu, San Jose, CA (US); Huan-Yi Lin, Huntington Beach, CA (US)

(73) Assignee: TBCASOFT, INC.

( * ) Notice: Subject to any disclaimer, the term of this patent is extended or adjusted under 35 U.S.C. 154(b) by 0 days.

(21) Appl. No.: 16/603,831

(22) PCT Filed: Jan. 22, 2018

(86) PCT No.: PCT/US2018/014603
§ 371 (c)(1),
(2) Date: Oct. 9, 2019

(87) PCT Pub. No.: WO2018/194736
PCT Pub. Date: Oct. 25, 2018

(65) Prior Publication Data
US 2020/0134586 A1    Apr. 30, 2020

Related U.S. Application Data

(60) Provisional application No. 62/619,058, filed on Jan. 18, 2018, provisional application No. 62/486,916, filed on Apr. 18, 2017.

(51) Int. Cl.
*G06Q 20/12*    (2012.01)
*G06Q 20/36*    (2012.01)
(Continued)

(52) U.S. Cl.
CPC ..... *G06Q 20/1235* (2013.01); *G06Q 20/3674* (2013.01); *G06Q 20/383* (2013.01); *G06Q 20/407* (2013.01); *H04L 9/0825* (2013.01)

(58) Field of Classification Search
None
See application file for complete search history.

(56) References Cited

U.S. PATENT DOCUMENTS

| 7,328,189 B2 * | 2/2008 | Ling | ...................... | G06Q 20/04 |
| | | | | 705/41 |
| 8,838,668 B2 * | 9/2014 | Eisner | ................... | H04L 69/161 |
| | | | | 726/13 |

(Continued)

FOREIGN PATENT DOCUMENTS

| CN | 103927659 A | 7/2014 |
| JP | 06162059 A | 6/1994 |

(Continued)

OTHER PUBLICATIONS

Bhargav-Spantzel, A., "Protocols and systems for privacy preserving protection of digital identity", Purdue University, ProQuest Dissertations & Theses. (2007) (Year: 2007).*

(Continued)

*Primary Examiner* — Clay C Lee
(74) *Attorney, Agent, or Firm* — Huan-Yi Lin

(57) ABSTRACT

The present disclosure concerns methods and systems for increasing anonymity and traceability of a digital property management system that manages digital property transactions on a distributed transaction consensus network. The digital property management system comprises a sender's digital property manager and a recipient's digital property manager. The sender's digital property manager further comprises a sender's module and a sender's transaction node and the recipient's digital property manager further comprises a recipient' module and a recipient's transaction node.

(Continued)

To increase anonymity of a remittance transaction between, sender's module is not allowed to access a recipient's virtual identification. Thus, recipient's module generates a token to temporarily replace a recipient's virtual identification. To increase anonymity, an encrypted label is generated for each sub-transaction to identify sub-transactions and their sequence in the same remittance set.

18 Claims, 13 Drawing Sheets

(51) Int. Cl.
    *G06Q 20/38*     (2012.01)
    *G06Q 20/40*     (2012.01)
    *H04L 9/08*     (2006.01)

(56) References Cited

U.S. PATENT DOCUMENTS

| | | | |
|---|---|---|---|
| 10,148,699 B1* | 12/2018 | Shahidzadeh | H04L 63/205 |
| 2004/0083391 A1* | 4/2004 | De Jong | H04L 63/08 |
| | | | 726/27 |
| 2013/0060708 A1 | 3/2013 | Oskolkov et al. | |
| 2013/0282567 A1 | 10/2013 | Bacastow et al. | |
| 2013/0311381 A1 | 11/2013 | Johnson | |
| 2014/0012749 A1 | 1/2014 | Lee et al. | |
| 2015/0026080 A1 | 1/2015 | Roever et al. | |
| 2015/0032626 A1* | 1/2015 | Dill | G06Q 20/4016 |
| | | | 705/44 |
| 2015/0046338 A1* | 2/2015 | Laxminarayanan | |
| | | | G06Q 20/38215 |
| | | | 705/67 |
| 2015/0170112 A1* | 6/2015 | DeCastro | G06Q 20/381 |
| | | | 705/39 |
| 2016/0162897 A1 | 6/2016 | Feeney | |
| 2016/0224949 A1 | 8/2016 | Thomas et al. | |
| 2016/0275483 A1 | 9/2016 | Zhou | |
| 2016/0300234 A1* | 10/2016 | Moss-Pultz | H04L 9/3247 |
| 2016/0321625 A1* | 11/2016 | Gilliam, III | G06Q 20/10 |
| 2017/0011460 A1 | 1/2017 | Molinari et al. | |
| 2017/0091761 A1 | 3/2017 | Dharmapalan | |
| 2017/0116608 A1* | 4/2017 | Forzley | G06Q 20/4014 |
| 2018/0268382 A1* | 9/2018 | Wasserman | G06Q 20/223 |
| 2018/0285838 A1* | 10/2018 | Franaszek | H04L 9/3247 |

FOREIGN PATENT DOCUMENTS

| | | | |
|---|---|---|---|
| JP | H06162059 A | 6/1994 | |
| JP | H11510278 A | 9/1999 | |
| JP | 2000322486 A | 11/2000 | |
| WO | 2016164496 A1 | 10/2016 | |
| WO | WO-2017091530 A1 * | 6/2017 | G06Q 20/06 |
| WO | WO-2017145004 A1 * | 8/2017 | G06Q 20/3829 |

OTHER PUBLICATIONS

European search report issued in EP18788043.0 dated on Oct. 30, 2020.
International Search Report and Written Opinion mailed on Jun. 29, 2018 in International Patent Application No. PCT/US2018/014603, filed on Jan. 22, 2018.
Written Opinion of Singapore counterpart application No. 11201909404T issued on Mar. 1, 2021.
Office Action of Japan counterpart application No. 2019-555444 issued on Feb. 15, 2022.

* cited by examiner

Block Structure

| Description | Data Type | Sample |
|---|---|---|
| Magic number | Constant | 0xABA79795L |
| Block size in bytes | 4 bytes | 1000000 |
| Block Header | 80 Bytes | |
| Number of Transactions | 1-9 bytes | 3 |
| List of Transactions | Variable | |
| Number of Signatures | 1-9 bytes | 1 |
| List of Signatures | Variable | |

Fig. 4A

Block Header Structure

| Description | Data Type | Sample |
|---|---|---|
| Block Version | 4 bytes | 3 |
| Previous Block Hash | 32 bytes | 573fec1ed49368b8218b6b87d4fdf2f751970cc24b9665d7ac5b78eeb30b598f |
| Merkel Hash of Block Transactions | 32 bytes | 95db99531562553788760df483ca058 94c3e6c8be5c2a8f588794973211 1bfe2 |
| Timestamp in Seconds | 4 bytes | 1491598664 |
| Legacy Difficulty | 4 bytes | 1e0fff0 |
| Nonce | 4 bytes | 1 |

Fig. 4B

Signature

| Description | Data Type | Sample |
|---|---|---|
| Signature Length | 1-9 bytes | 139 |
| Signature | Variable | 30450220 6e21798a42fae0e854281 abd38bacd1aeed3ee3738d9e14466 18c4571d10 90db022100e2ac980643b0b82c0e8 8ffdfec6b64e3e6ba35e7ba5fdd7d 5d6cc8d25c6b241501 |
| Miner Public Key | 65 bytes | 90db022100e2ac980643b0b82c0e8 8ffdfec6b64e3e6ba35e7ba5fdd7d |

Fig. 4C

| Standard Transaction | |
|---|---|
| 4 bytes | Version number | 1 |
| 1-9 bytes | Number of inputs contained | Positive Integer |
| Varies | Sequential list of inputs | Transaction Inputs |
| 1-9 bytes | Number of outputs contained | Positive Integer |
| Varies | Sequential list of outputs | Transaction Outputs |
| 4 bytes | Block height or timestamp when transaction is final | 0 |

FIG. 6A

| Transaction Input (Standard Transaction) | | |
|---|---|---|
| 32 bytes | Previous transaction hash | E.g:1979fe5abb7192c637cfa4c14a1e953ec0f02c54de28c8f82fc21245c0cab8ac |
| 4 bytes | Referenced output offset (0-indexed) | Non-negative integer |
| 1-9 bytes | Size of ScriptSig | Positive integer |
| Varies | ScriptSig (signature and public key to unlock) | E.g: 473044220447d5ae4624357f6b1361daac5d3aeaae5e197551df067f42aec5c7a5e5 1f2204117b06f77809295dd385da9b96567d3dc568e87d622ee37a758c836bb136e1212 e0ac817fd21a44b43c6468d71a472e198521fcb66e36663b5a817398 6d7609f |
| 4 bytes | Sequence Number | 0xFFFFFFFF |

FIG. 6B

| | Transaction Output | |
|---|---|---|
| 8 bytes | Value of output | Positive Integer |
| 4 bytes | FC of output (mapped to a currency such as JPY.SB) | Integer > 2 (0 and 1 are reserved) |
| 1-9 bytes | Size of ScriptPubKey | Positive integer |
| Varies | ScriptPubKey (locking script) | OP_DUP OP_HASH160 <Address> OP_EQUALVERIFY OP_CHECKSIG |

FIG. 6C

|  |  | William's virtual wallet | ATT's virtual wallet | FET's virtual wallet | Steve's virtual wallet |
|---|---|---|---|---|---|
| UTXOs before remittance transaction | Spendable UTXOs | 4 $USD.ATT<br>21 $USD.ATT<br>50 $USD.ATT | 28 $USD.ATT<br>36 $USD.ATT<br>66 $USD.ATT | 17 $USD.FET<br>48 $USD.FET<br>123 $USD.FET | 100 $USD.FET |
| UTXOs after sending transaction | Spendable UTXOs | 4 $USD.ATT | 28 $USD.ATT<br>36 $USD.ATT<br>66 $USD.ATT | 17 $USD.FET<br>48 $USD.FET<br>123 $USD.FET | 100 $USD.FET |
|  | UTXOs from pending transaction | 11 $USD.ATT | 60 $USD.ATT |  |  |
| UTXOs after inter-manager transaction | Spendable UTXOs | 4 $USD.ATT | 28 $USD.ATT<br>36 $USD.ATT | 17 $USD.FET<br>48 $USD.FET<br>123 $USD.FET | 100 $USD.FET |
|  | UTXOs from pending transaction | 11 $USD.ATT | 60 $USD.ATT<br>6 $USD.ATT | 60 $USD.ATT |  |
| UTXOs after delivery transaction | Spendable UTXOs | 4 $USD.ATT | 28 $USD.ATT<br>36 $USD.ATT | 123 $USD.FET | 100 $USD.FET |
|  | UTXOs from pending transaction | 11 $USD.ATT | 60 $USD.ATT<br>6 $USD.ATT | 60 $USD.ATT<br>5 $USD.FET | 60 $USD.FET |
| UTXOs after remittance transaction is committed | Spendable UTXOs | 4 $USD.ATT<br>11 $USD.ATT | 6 $USD.ATT<br>28 $USD.ATT<br>36 $USD.ATT<br>60 $USD.ATT | 60 $USD.ATT<br>5 $USD.FET<br>123 $USD.FET | 60 $USD.FET<br>100 $USD.FET |

FIG. 7

| First Delivery Transaction | |
| --- | --- |
| Input UTXO | Output UTXO |
| 17 $USD.FET | 17 $USD.FET |

| Second Delivery Transaction | |
| --- | --- |
| Input UTXO | Output UTXO |
| 48 $USD.FET | 43 $USD.FET<br>5 $USD.FET |

| Inter-Manager Transaction | |
| --- | --- |
| Input UTXO | Output UTXO |
| 28 $USD.ATT<br>36 $USD.ATT | 60 $USD.ATT<br>4 $USD.ATT |

| Sending Transaction | |
| --- | --- |
| Input UTXO | Output UTXO |
| 21 $USD.ATT<br>50 $USD.ATT | 60 $USD.ATT<br>11 $USD.ATT |

Fig. 10

| Sending Transaction | |
|---|---|
| Input UTXO | Output UTXO |
| 20 $USD.ATT | 10 $USD.ATT<br>6 $USD.ATT<br>4 $USD.ATT |

| First Inter-Manager Transaction | |
|---|---|
| Input UTXO | Output UTXO |
| 10 $USD.ATT | 10 $USD.ATT |

| Second Inter-Manager Transaction | |
|---|---|
| Input UTXO | Output UTXO |
| 5 $USD.ATT | 5 $USD.ATT |

| Third Inter-Manager Transaction | |
|---|---|
| Input UTXO | Output UTXO |
| 5 $USD.ATT | 1 $USD.ATT<br>4 $USD.ATT |

| First Delivery Transaction | |
|---|---|
| Input UTXO | Output UTXO |
| 10 $USD.FET | 10 $USD.FET |

| Second Delivery Transaction | |
|---|---|
| Input UTXO | Output UTXO |
| 10 $USD.FET | 6 $USD.FET<br>4 $USD.FET |

| Transaction (TX Set) | | |
|---|---|---|
| Description | Data Type | Sample |
| Version | 4 bytes | 1 |
| Number of Inputs | 1-9 bytes | 1 |
| Inputs | Variable | |
| Number of Outputs | 1-9 bytes | 2 |
| Outputs | Variable | |
| Lock time | 4 bytes | 0 |
| Transaciton Type | 4 bytes | 1 |
| Transaction Set | 32 bytes | 304502206e21798a42fae0e854281abd |

ANONYMITY AND TRACEABILITY OF DIGITAL PROPERTY TRANSACTIONS ON A DISTRIBUTED TRANSACTION CONSENSUS NETWORK

BACKGROUND OF THE INVENTION

Field of the Invention

The present disclosure relates generally to a method and related system, apparatus, and computer readable medium for increasing anonymity and traceability of digital property transactions on a distributed transaction consensus network.

Description of Related Art

Some cryptocurrency systems have higher anonymity and lower traceability, such as Bitcoin. Individuals or corporate entities can open accounts without disclosing any real world identification. Each account is identified by a virtual wallet address. Account owners can then receive and remit cryptocurrencies from and to others. Transactions recorded in blockchains include senders' virtual wallet addresses, recipients' virtual wallet addresses, and remittance amounts. Such systems have high anonymity and low traceability, since there is no connection or linkage between account owners' real world identification (such as name, social security number, and telephone number), and their virtual world identification (virtual wallet address). Even if the systems are hacked and the transaction ledgers are stolen, account owners' real world identification will not be discovered. It is almost impossible to trace the real senders and recipients of transactions. As a result, such a system can become a money laundering facilitator.

SUMMARY

The present disclosure is directed to a method and related system, apparatus and computer readable medium for increasing anonymity and traceability of a digital property management system that manages digital property transactions on a distributed transaction consensus network, using cryptographic techniques to process transactions.

A digital property management system comprises a plurality of digital property managers which can be banks, telecommunication carriers ("telco"), etc. Each digital property manager has (1) a digital property management module ("module") to handle its customer (subscriber) information and customers' virtual wallets, and to convert customers' remittance requests to actual transactions, and (2) a transaction node, a node of a distributed transaction consensus network, to process transactions.

A digital property management module includes a variety of hardware and software to perform the required functions. When a subscriber opens a virtual wallet with a digital property manager, his/her personal information is created and maintained by its digital property management module, which includes the physical identification which can be used to identify an individual or entity (such as name, social security number, and telephone number) and the virtual identification which can be used to identify his/her virtual wallet (such as virtual wallet ID and virtual wallet address). Thus, sender's digital property management module ("sender's module) has sender's physical identification and virtual identification, and recipient's digital property management module ("recipient's module") has recipient's physical identification and virtual identification. When requesting a remittance transaction, a sender usually provides sender's digital property management module ("sender's module") with his/her physical identification, recipient's physical identification and remittance amount. To increase anonymity, several measures can be used. In one embodiment, sender's module is not allowed to access recipient's virtual identification so that it cannot easily trace a specific remittance transaction. Similarly, recipient's module is not allowed to access sender's virtual identification. However, to construct a remittance transaction, both sender's virtual identification and recipient's virtual identification have to be used. Thus, sender's module and recipient's module have to work cooperatively but at the same time avoid unnecessary information sharing to protect personal privacy. In one embodiment, since sender's module cannot access recipient's virtual identification, recipient's module has to provide a token to sender's module as a temporary replacement of recipient's virtual identification. Through this approach, a hacker cannot trace specific remittance transactions even if it can access the distributed ledger of the distributed transaction consensus network and digital property management modules. Likewise, no single digital property management module can trace specific remittance transactions because it cannot match both sender's and recipient's physical identification and virtual identification.

To further increase anonymity and security, modules and nodes can create a signature on the message and send them together to prove authentication of the message. To avoid irrelevant module from intercepting and misusing the message, modules and nodes can also encrypt the message.

To avoid the digital property management system from becoming a money laundering facilitator, the system has to provide a mechanism to trace specific transactions when necessary. A remittance transaction may comprise a plurality of sub-transactions (collectively a "transaction set"), including sending transaction, inter-manager transaction, and delivery transaction. Either sender's module or recipient's module can create a label encrypted by using a tracing key for each sub-transaction. The label includes information to identify each sub-transaction in a transaction set and their sequences). A tracing key can be a symmetric key or an asymmetric key. In one embodiment, when the tracing key is a symmetric key, each digital property management module creates and holds its own symmetric tracing key for encrypting labels. The symmetric tracing key is also shared with network administrator TBCA 110 or an authorized/assigned node. The authorized or assigned node that performs the tracing function is considered as network administrator. In another embodiment, when the tracing key is an asymmetric key, network administrator TBCA 110 or an authorized/assigned node creates a tracing key pair comprising a tracing public key and a tracing private key. The tracing public key is used by digital property management module to encrypt labels for each sub-transaction in a remittance transaction set. The tracing private key is kept confidential by the network administrator. When necessary, a network administrator or an authorized/assigned node can decrypt the label and reconstruct the whole remittance transaction.

Additional features and advantages of the disclosure will be set forth in the descriptions that follow, and in part will be apparent from the descriptions, or may be learned by practice of the disclosure. The objectives and other advantages of the disclosure will be realized and attained by the structure and method particularly pointed out in the written description and claims thereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

FIG. 4 is a table illustrating an example of block structure, block header structure, and signature.

FIGS. 6A-C are tables illustrating an example of data structure used for a remittance transaction between two virtual wallets.

FIG. 7 is a table illustrating an example of a remittance transaction comprising sending transaction, inter-manager transaction, and delivery transaction.

FIG. 11 are tables illustrating an example of a remittance transaction the input digital property of whose sub-transactions is at a base amount.

FIG. 12 is a table illustrating an example of a remittance transaction data structure including a transaction set field for tracking.

DETAILED DESCRIPTION OF PREFERRED EMBODIMENTS

Figure 1:
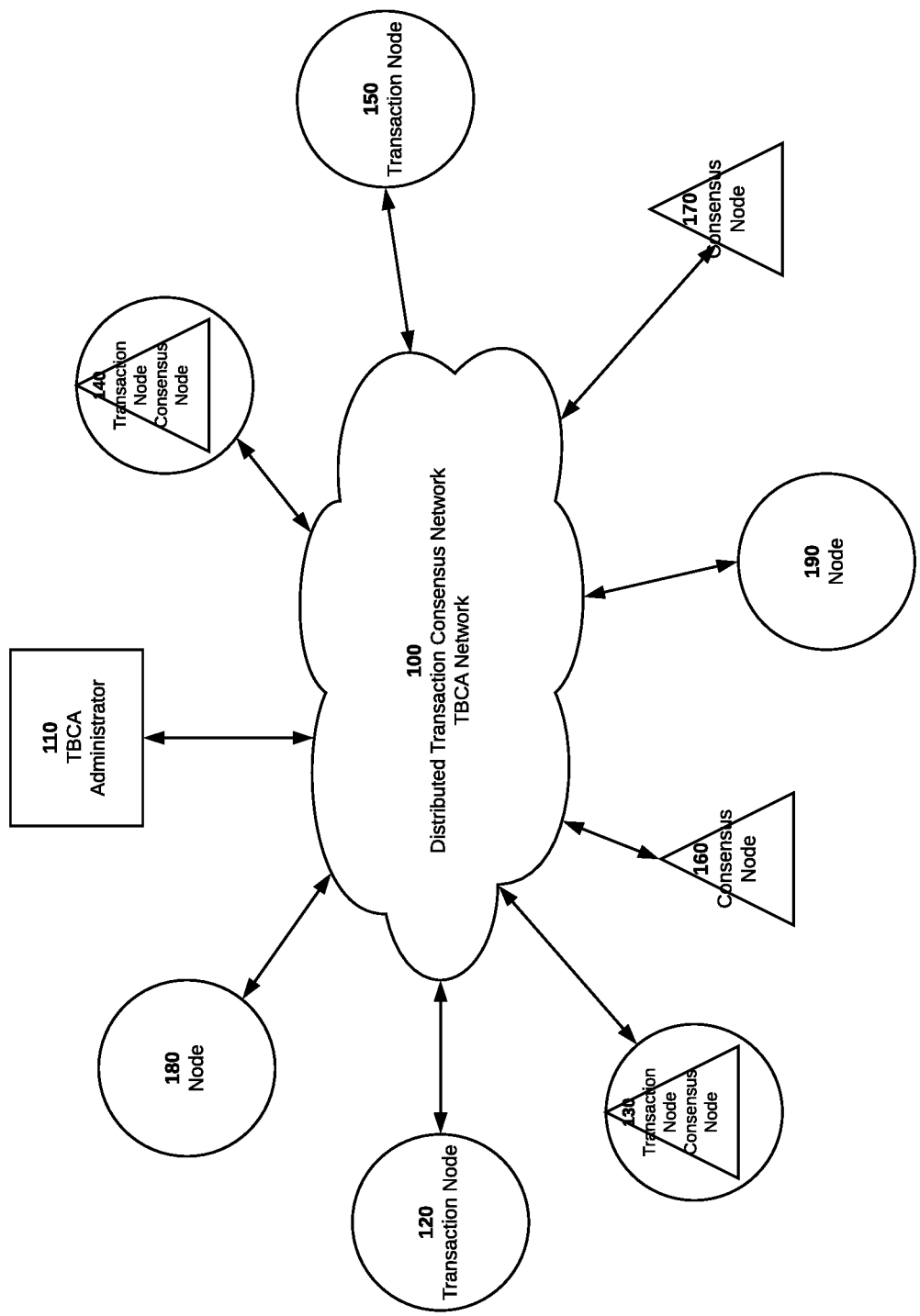
FIG. 1 is a schematic diagram illustrating a distributed transaction consensus network.

The terminology used in the description presented below is intended to be interpreted in its broadest reasonable manner, even though it is used in conjunction with a detailed description of certain specific embodiments of the technology. Certain terms may even be emphasized below; however, any terminology intended to be interpreted in any restricted manner will be specifically defined as such in this Detailed Description section.

The embodiments introduced below can be implemented by programmable circuitry programmed or configured by software and/or firmware, or entirely by special-purpose circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

The described embodiments concern one or more methods, systems, apparatuses, and computer readable mediums storing processor-executable process steps to increase anonymity and traceability of a digital property management system that manage digital property transactions based on cryptographic technology in a distributed transaction consensus network. Various cryptographic algorithms known to people with ordinary skill in the art can be used. Since a distributed ledger is used to record digital property transactions, a complete copy of the distributed ledger is maintained at a large number of nodes in the distributed transaction consensus network. The risk of hackers' unauthorized access to the transaction information recorded in the distributed ledger, and to the subscriber and virtual wallet information stored in the digital property management modules cannot be completely avoided. Thus, anonymity is desired in order to avoid personal transaction information to be misused. However, given this anonymity feature of digital property transactions, such a distributed transaction consensus network may become a money laundering facilitator. Thus, the digital property management system has to increase the anonymity while being able to trace specific digital property transactions at the same time.

A digital property management system comprises a plurality of digital property managers which can be banks, telecommunication carriers ("telco"), etc. Each digital property manager has (1) a digital property management module ("module") to handle its customer (subscriber) information and customers' virtual wallets, and to convert customers' remittance requests to actual remittance transactions, and (2) a transaction node, a node of a distributed transaction consensus network, to process transactions.

A digital property management module includes a variety of hardware and software to perform the required functions. When a subscriber opens a virtual wallet with a digital property manager, his/her personal information is created and maintained, including the physical identification which can be used to identify an individual or entity in the real world (such as name, social security number, and telephone number) and the virtual identification which can be used to identify his/her virtual wallet (such as virtual wallet ID and virtual wallet address), by its digital property management module. Thus, sender's digital property management module ("sender's module) has sender's physical identification and virtual identification, and recipient's digital property management module ("recipient's module") has recipient's physical identification and virtual identification. To increase anonymity, several measures can be used. In one embodiment, sender's module is not allowed to access recipient's virtual identification so that it cannot easily trace a specific remittance transaction. Similarly, recipient's module is not allowed to access sender's virtual identification.

When requesting a remittance transaction, a sender usually provides sender's module with his/her physical identification, recipient's physical identification and remittance amount. However, to construct a remittance transaction, both sender's virtual identification and recipient's virtual identification have to be used. Thus, sender's module and recipient's module have to work cooperatively but at the same time avoid unnecessary information sharing to protect personal transaction information. In one embodiment, since sender's module cannot access recipient's virtual identification, recipient's module has to provide a token to sender's module as a temporary replacement of recipient's virtual identification. Through this approach, a hacker cannot trace specific remittance transactions even if it can access the distributed ledger of the distributed transaction consensus network and/or digital property management modules. Likewise, no single digital property management module can trace specific remittance transactions because it cannot match both sender's and recipient's physical identification and virtual identification.

For example, a sender, e.g. William, initiates a remittance transaction to transfer digital property to a recipient, e.g. Steve. William has a virtual wallet with ATT from which his mobile phone number (or mobile subscription number, "msn") subscribes a service. William's physical identification is his mobile phone number and his virtual identification is his virtual wallet address. Steve has a virtual wallet with FET from which his mobile phone number subscribes a service. Steve's physical identification is also his mobile phone number and his virtual identification is his virtual wallet address. A sender's digital property management module ("sender's module"), e.g. ATT module, requests a token from a recipient's digital property management module ("recipient's module"), e.g. FET module, and uses the token as a temporary replacement of the recipient's virtual wallet address for the construction of the temporary transaction. Thus, the ATT module does not have access to the Steve's virtual wallet address. Even if a hacker breaks into a server of ATT module, the information of the completed remittance transaction can still be protected.

When a remittance transaction comprises a plurality sub-transactions, several measures can be used to break the connection between a sender's virtual wallet, a recipient's virtual wallet, and an amount of a remittance transaction. In one embodiment, a remittance transaction from a sender to a recipient comprises three parts which respectively are (a) sending transaction—transferring a digital property from sender's virtual wallet to the virtual wallet of sender's module, (b) inter-manager transaction—transferring a digital property from the wallet of sender's module to the wallet of recipient's module, and (c) delivery transaction—transferring a digital property from the virtual wallet of recipient's module to recipient's virtual wallet. Each part can constitute one or more sub-transaction. The anonymity is further increased, if one or more of the sending transaction, inter-manager transaction, and delivery transaction can be further split into two or more sub-transactions. In another embodiment, the input digital properties, such as input UTXOs, of these sub-transactions are at a base amount, in order to further break the connection between the sub-transactions.

In order to increase traceability, when a remittance transaction comprises a plurality of sub-transactions, an encrypted label is created to identify and specify the sequence of each sub-transaction in the remittance transaction set. In one embodiment, a remittance transaction comprises three sub-transactions, (i.e. sending transaction, inter-manager transaction, and delivery transaction), each of which is given a label to show they belong to a specific transaction set and their sequence in the set. The label is encrypted with a tracing key so that only the network administrator and/or authorized transaction node can, after decryption, identify the three sub-transactions in the same transaction set to rebuild the set and trace the virtual wallets and the amount in connection to a specific transaction.

The digital property management system uses various symmetric and/or asymmetric key algorithms to increase transaction security, anonymity, and traceability. A symmetric key algorithm has only one key. An asymmetric key algorithm has a key pair comprising a public key and a private key. For example, symmetric key algorithms AES (Advanced Encryption Standard) and DES (Data Encryption Standard) can be used for encryption; asymmetric key algorithm ECDSA (Elliptic Curve Digital Signature Algorithm) can be used for signature; asymmetric key algorithm RSA (Rivest-Shamir-Adleman) can be used for both signature and encryption. To increase transaction security, a virtual wallet has an asymmetric key pair comprising a transaction public key and a transaction private key. To increase anonymity, a subscriber, a digital property management module, and a transaction node can respectively have its own asymmetric key pair comprising a message public key and a message private key for signature and/or encryption. To increase traceability, either a symmetric key or an asymmetric key pair can be used for encryption. When an asymmetric key pair is used, a network administrator or its authorized/assigned node has a tracing public key and a tracing private key. When a symmetric key is used, a digital property management module has its own tracing key shared with a network administrator or its authorized/assigned node. For a less complicated system, a message key pair can be the same as the transaction key pair.

Figure 2:
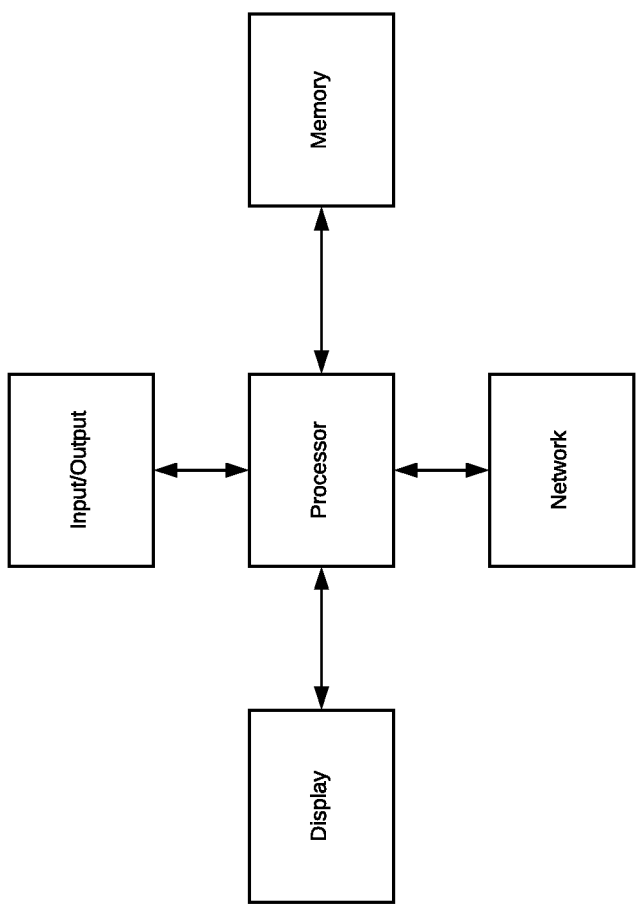
FIG. 2 is a block diagram illustrating an example node of the above network.

In one embodiment, as shown in FIG. 1, a distributed transaction consensus network 100, referred to as TBCA (The BlockChain Alliance) Network in this disclosure, using cryptographic technology, is implemented to process digital property transactions. TBCA Network 100 comprises a plurality of nodes, including an administrator 110, transaction nodes 120, 130, 140, 150, consensus nodes 130, 140, 160, 170 and other nodes 180, 190. As shown in FIG. 2, each node usually comprises a processor to perform calculations and execute programs; a memory to store software, programs, and data; a display to communicate with users; an input/output component to communicate with users and other devices, and a network component to connect with network via wired or wireless channels.

The administrator 110, referred to as TBCA in this disclosure, sets rules and manages the TBCA Network 100. The administrator 110 has a virtual wallet (not shown) to store digital fee tokens issued by itself or digital properties issued by other digital property managers. The administrator 110 can admit a node to join the distributed transaction consensus network 100 (TBCA Network) and become a member of the network. In addition, the administrator 110 (TBCA) can authorize a digital property manager to issue various digital properties, such as digital currencies, digital securities, digital bonds, digital futures, and digital precious metals. A digital property manager can issue digital properties through its digital property management module or its transaction nodes, such as 120-150. The administrator 110 can authorize or assign other nodes to perform part of its functions, such as tracing specific digital property transactions. To that extent, the administrator includes its authorized and/or assigned nodes.

Figure 3:
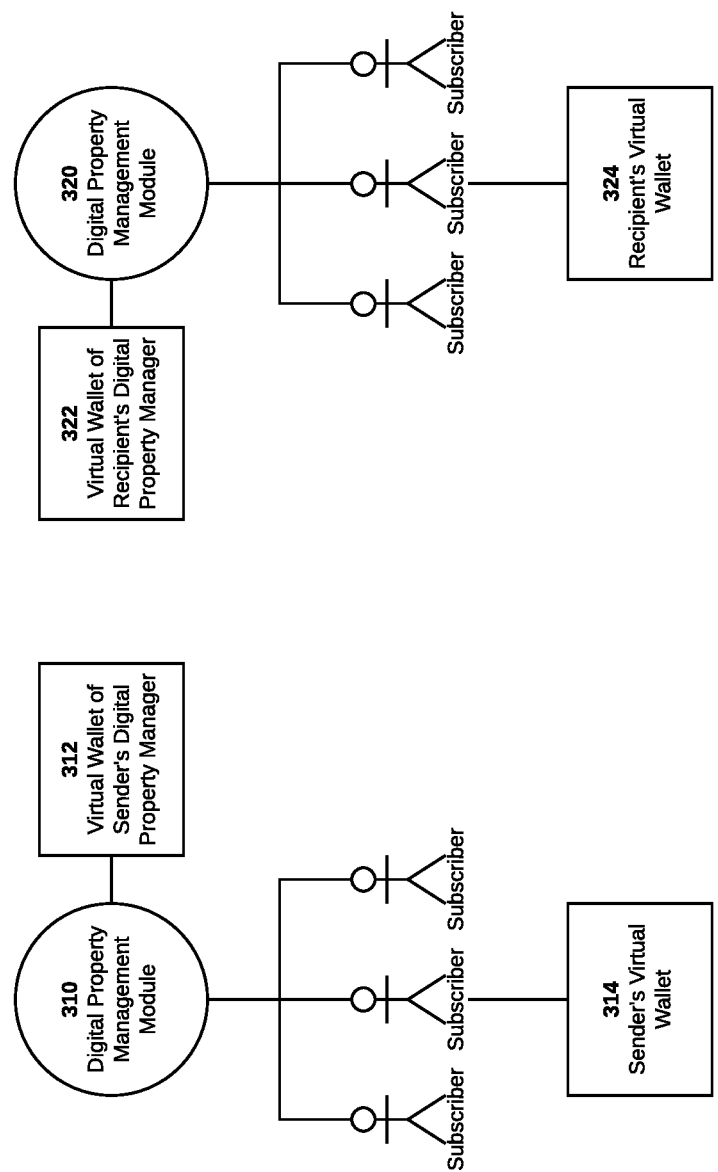
FIG. 3 is a block diagram showing digital property management modules, subscribers, and their corresponding virtual wallets.

In one embodiment, a transaction node, e.g. 120, 150, can issue digital properties for its digital property manager. The transaction node is associated with a digital property manager, such as a bank, e.g. Bank of America ("BOA") or Chase; an investment/trading institute, e.g. Fidelity or Goldman Sachs; or a telecommunication operator, e.g. AT&T Inc. (ATT), SoftBank Corp. (SBT), or Chunghwa Telecom. In one embodiment, a digital property can be any of digital currencies, digital securities, digital bonds, digital futures, digital precious metals or digital fee tokens. As shown in FIG. 3, the issued digital properties are stored to a virtual wallet 312, 322 of the digital property manager. Such a virtual wallet 312, 322 that can store various digital properties issued by its own digital property manager, other digital property managers, or the administrator TBCA 110 is managed by a digital property management module 310, 320 of the digital property manager. Each virtual wallet has a virtual wallet ID, which in some embodiment can be the virtual wallet address. In addition, each virtual wallet has a transaction public key and a transaction private key. To spend the digital property stored in the virtual wallet, the transaction private key associated with its virtual wallet has to be used to sign transactions.

Each transaction node 120, 150 corresponds to a digital property management module ("module") which comprises hardware and software to construct, sign, and send transactions to the transaction node. In one embodiment, a digital property management module includes a wallet server, a signing server, a middleware (also known as transaction processing engine), token mapping database, message public key of transaction node look up API, etc. to implement these functions.

A consensus node 130, 140, 160, 170 can propose, validate, and record transactions in a distributed ledger (open to a member/node of TBCA Network 100). In some distributed transaction consensus network, a consensus node may receive a reward in exchange for the service it provides. In that situation, a consensus node is often referred to as a miner. The reward can be T coin issued by the administrator 110 (TBCA) and/or digital properties issued by digital property managers, which can be stored in a miner's virtual wallet (not shown). In other distributed transaction consensus network, a consensus node does not receive any reward. In that situation, a consensus node is often referred to as a validator. The validator who is actively proposing a new block is often referred to as a proposer or block proposer.

A distributed ledger is essentially a digital property database or data structure that can be shared across a distributed transaction consensus network of multiple nodes in various sites, geographies or institutions. All nodes within the network can have their own identical copy of the ledger. Any changes to the ledger can be reflected in all copies in minutes, or in some cases, seconds. The security and accuracy of the digital properties stored in the ledger are maintained cryptographically through the use of keys and signatures to control who can do what within the distributed ledger. In an embodiment, a blockchain data structure is used for a distributed ledger. A consensus node can create a new block to record validated transactions, and then propagate the new block to other nodes of the network. However, a distributed ledger can use any other data structure known to people with ordinary skill in the art.

To maximize the throughput of new block generation so that the TBCA Network 100 can complete an enormous number of transactions instantly, the administrator 110 can manage the number of consensus nodes, and/or set rules for consensus nodes to compete against and/or support with each other, and/or designate one or more consensus node to generate a new block for recording transactions. A transaction node 130, 140 can also be a consensus node. Other nodes 180, 190 can be admitted to join the TBCA Network 100 for other functions.

Subscribers of a digital property manager can open and own one or more virtual wallets to be managed by its digital property management module. Each subscriber can have one or more physical identification, such as a social security number, a passport number, a telephone number. Similarly, each subscriber can have one or more virtual identification, such as virtual wallet ID, virtual wallet address, etc. In some embodiment, the virtual wallet ID is the virtual wallet address. A data structure mapping each subscriber's physical identifications to his/her virtual identifications is created and maintained by the digital property management module of the subscriber's digital property manager.

In addition, each subscriber's virtual wallet has a transaction public key and a transaction private key. To spend the digital property stored in his or her virtual wallet, a subscriber has to use the transaction private key associated with the virtual wallet to sign transactions. In one embodiment as shown in FIG. 3, a virtual wallet 314, 324 is provided to store, send, receive, and manage digital properties, including multiple types of digital assets, credits, and obligations, such as digital currencies, digital securities, digital bonds, digital futures, digital precious metals and digital fee tokens, for a subscriber, e.g. an individual, investor, and/or trader. Each virtual wallet 314, 324 is associated with a digital property management module 310, 320 and can be identified by a virtual wallet ID (or address in some embodiment), e.g. 1F1tAaz5x1HUXrCNLbtMDqcw6o5GNn4xq and 16ULZUJwv1HZJkFrs8aa9c3xHTjiayyTNS. In one embodiment, a virtual wallet 314 can only store, send, receive, and manage various digital properties issued by the digital property manager through its digital property management module 310, with which the virtual wallet 314 is associated, rather than digital properties issued by other digital property managers.

In addition to the pair of transaction public key and transaction private key, each subscriber has a pair of message public key and message private key used for providing an encryption on confidential messages or a signature to prove messages are authentic. A database of one-to-one mappings of subscribers to their message public key is created and maintained so that such mappings are accessible by all digital property management modules. Whenever a subscriber opens a virtual wallet with a digital property manager, a mapping should be added.

Each transaction is recorded by consensus nodes and transaction nodes in a distributed ledger which is open to other nodes within the TBCA Network 100. In one embodiment, the distributed ledger comprises blocks in chain. FIGS. 4A-C illustrate an embodiment of the block structure, block header structure and signature. Each block is identified by a block hash, made by hashing the block header twice through the SHA256 cryptographic algorithm. In addition, each block is referenced back to a previous block, known as the parent block, through a "previous block hash" field in the block header. Thus, the sequence of hashes links each block to its parent to create a chain going back all the way to the first block ever created. As the blocks pile on top of each other, it becomes exponentially harder to reverse the transactions. Therefore, transactions recorded in the blocks become more and more trusted over the time. Depending on the size of the block and transactions, an average block can contain several hundreds of transactions. A complete and up-to-date distributed ledger is stored in a database (or a file) of the administrator, transaction nodes, consensus nodes, and other nodes admitted by the administrator 110 to store such ledger ("full node"). Some nodes can select to store only a portion of such ledger.

Figure 5:
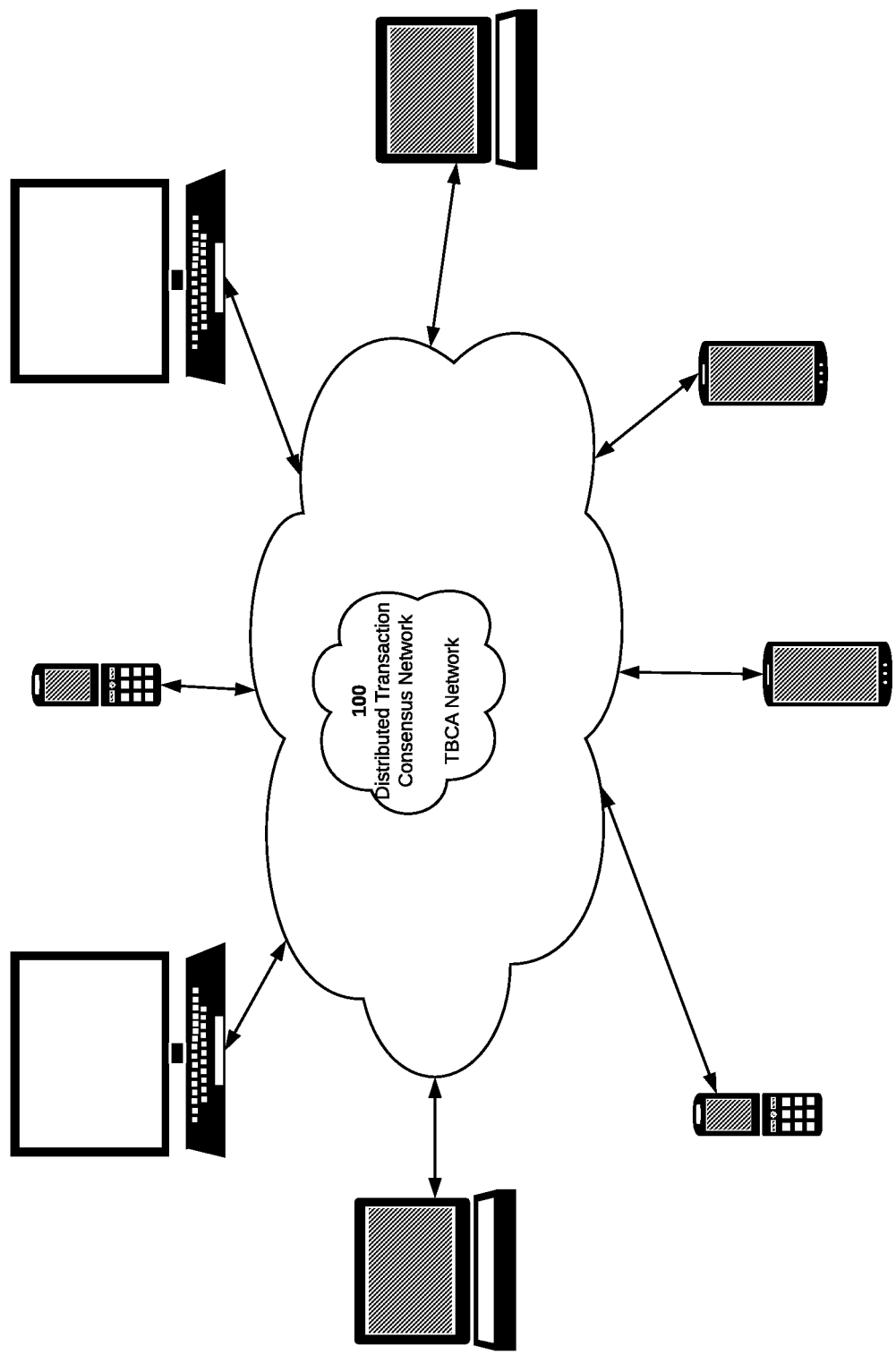
FIG. 5. is a schematic diagram illustrating example network devices.

As shown in FIG. 5, subscribers of digital property managers can request, via a network device (connected to any Internet connection via mobile, WiFi, or wired channel), such as a server, a desktop computer, a laptop computer, a tablet, a mobile phone, a landline phone, and a PDA, a transaction to be processed and recorded by the TBCA Network 100. In one embodiment, the fundamental building block of digital property transactions is an unspent transaction output ("UTXO"). A UTXO is an indivisible chunk of digital property locked by a transaction private key to a specific virtual wallet and can be at any arbitrary value. A subscriber's virtual wallet may comprise many UTXOs from hundreds of prior transactions recorded in hundreds of blocks. In one embodiment, the subscriber can request a remittance transaction to transfer a specific value of the digital property to a restaurant, e.g. to pay for a meal. The transaction may comprise one or more transaction inputs (input UTXO) from the subscriber's virtual wallet and one or more transaction outputs (output UTXO) to receiving virtual wallets, e.g. meal value to the restaurant and the change back to the subscriber). Transaction inputs are pointers to UTXO that are generated from prior transactions and never spent before. Transaction outputs are UTXO locked to receiving virtual wallets, which can be spent by their owners in the future. As a general rule, the sum of value of transaction inputs should be equal to the sum of value of transaction outputs. No value should be generated or lost in a regular digital property transaction.

A transaction is regularly prepared by a digital property management module which then submits the transaction to its transaction node, a node of the distributed transaction consensus network, such as TBCA Network 100, for recording in the distributed ledger. In one embodiment, the digital property management module comprises a wallet server, a signing server, and a middleware, as well as some data structures/databases and memory grids for storage. The wallet server receives transaction requests from subscribers, collects all necessary information, and submits it to the middleware. The middleware uses such information to construct the transaction represented by a string of bytes, and sends it back to the wallet server which then passes the transaction to the signing server. After signing the transaction using the transaction private key of the virtual wallet, the signing server returns the signed transaction to the wallet server, which then passes it back to the middleware. The middleware sends the signed transaction to a transaction node, a node of the distributed transaction consensus network, which propagates it to the network. After receiving the signed transaction, other nodes on the distributed transaction consensus network, including transaction nodes and consensus nodes, will independently verify and validate the transaction, and then add the validated transaction to the transaction pool. Each node independently validates every transaction using the same criteria before propagating it further. In an embodiment using blockchain data structure, a consensus node will create a new block pulling the transactions from the transaction pool. After it verifies and validates the new block, the consensus node then propagates the new block to other nodes. After receiving the new block, the nodes on the network will independently verify and validate the new block using the same criteria. Once a node has validated a new block, it will then connect the new block to its existing blockchain. Then, the transactions in this new block are committed. New owners can spend the output UTXO from these transactions. Eventually, each full node on the network will have a copy of the same ledger, or blockchain, unless the network is attacked, disconnected, or failed. A consensus requiring that a plurality of nodes, each of which independently verifies the same transactions and/or blocks with the same criteria, reach an agreement on the distributed ledger is a mechanism to enhance the security of transactions. The more nodes a distributed transaction consensus network requires to reach a consensus, the more secured the network is. Whether a consensus is reached can be determined by various rules and/or algorithms known to skilled people in the art. In one embodiment, when forking occurs, a consensus can be reached by comparing the length (or depth) of blocks in the chain, and the fork having a longer chain wins, such as by the algorithm adopted in Bitcoin network. The more computational power a miner or a group of miners collectively have, the more blocks they can generate under the proof of work approach. In other words, the blocks that are accepted by consensus nodes collectively having majority of computational power would become consensus later adopted by other nodes. In another embodiment, a consensus can be reached by a majority of consensus nodes. Thus, blocks that are validated by a majority of consensus nodes will be propagated to other nodes for verification and recording. As a distributed transaction consensus network, the TBCA Network 100 needs to reach a consensus on each transaction, which is then recorded in the distributed ledger stored in a plurality of nodes.

As discussed before, each virtual wallet is associated with a specific digital property management module which can be operated by a bank, a financial institute, a security trading company, an investment company, a telecommunication carrier ("telco"), etc. Each virtual wallet has a unique virtual wallet ID in TBCA Network 100. For example, William, as a subscriber, can have a plurality of virtual wallets, each of which is identified by a virtual wallet ID and respectively associated with Bank of America ("BOA"), Fidelity, or Goldman Sachs via an account number, or with AT&T Inc. ("ATT"), SoftBank Corp. ("SBT"), or FarEasTone Telecom ("FET") via a telephone number. In one embodiment, each virtual wallet can only store digital properties issued by the digital property manager with which the virtual wallet is associated. For example, William's virtual wallet associated with Bank of America can only store digital properties issued by Bank of America; William's virtual wallet associated with ATT can only store digital properties issued by ATT.

Each transaction node can issue various different types of digital properties, such as digital currencies, e.g. digital US Dollars, digital Japanese Yens, digital Euros, and digital New Taiwan Dollars; digital securities, e.g. digital Apple stocks, digital Google stocks, and digital mutual funds; digital precious metals, e.g. digital gold, digital platinum, and digital silver; and digital futures, e.g. digital futures of coffee beans, soy beans, and corns. Each digital property is characterized by the combination of both the type of digital property and its digital property manager. In one embodiment, the combination can be a symbol for the type of digital property followed by a symbol for the digital property manager with a dot separating both symbols. In one example, Bank of America (whose symbol is "BOA") can issue both digital US Dollars (whose symbol is "$USD") and digital Japanese Yens (whose symbol is "$JPY"), which, in this embodiment, can be identified as $USD.BOA (1 $USD.BOA is valued at 1 US Dollar in this embodiment) and $JPY.BOA (1 $JPY.BOA is valued at 1 Japanese Yen in this embodiment).

In one embodiment, a Flavored Coin ("FC") field of the UTXO is used to indicate the type of digital property and its issuer. As an example, FC equals to 10 to indicate digital US Dollars issued by FET ($USD.FET); FC equals to 11 to indicate digital New Taiwan Dollars issued by FET ($NTD.FET); FC equals to 20 to indicate digital US Dollars issued by ATT ($USD.ATT); FC equals to 21 to indicate digital New Taiwan Dollars issued by ATT ($NTD.ATT). In addition to the value (or amount or unit of digital property), each output UTXO includes the FC field to indicate the type of digital property and its issuer.

In one embodiment, a remittance transaction from a sender to a recipient comprises three parts, which respectively are (a) sending transaction—transferring a digital property (issued by sender's digital property manager) from sender's virtual wallet to the virtual wallet of sender's module, (b) inter-manager transaction—transferring a digital property (issued by sender's digital property manager or recipient's digital property manager) from the virtual wallet of sender's module to the virtual wallet of recipient's module, and (c) delivery transaction—transferring a digital property (issued by recipient's digital property manager) from the virtual wallet of recipient's module to recipient's virtual wallet. To accomplish this remittance transaction, three parts (a transaction set), for example three sub-transactions if each part constitutes a sub-transaction, must be validated and confirmed as a whole. If one sub-transaction is rejected, all three sub-transactions have to be rejected. FIGS. 6A-C illustrate an embodiment of the data structure of a remittance transaction and its transaction inputs and outputs. In one embodiment, this implementation also complies with an optional requirement that a virtual wallet of subscribers, such as senders and recipients, only stores digital properties issued by a digital property manager with which the subscriber's virtual wallet is associated.

In one embodiment, William in the United States wants to remit a payment, using digital property stored in his virtual wallet associated with ATT module (sender's module) to Steve in Taiwan, who has a virtual wallet associated with FET (recipient's module). William sends a remittance request from his mobile phone to ATT module (sender's module). The remittance request includes William's mobile phone number (also referred to as mobile subscriber number, MSN) with ATT, Steve's mobile phone number with FET, and the amount and type of digital property to be remitted, for example 60 $USD.ATT (digital US Dollars issued by ATT). The ATT module (sender's digital property management module) will then communicate with the FET module (recipient's digital property management module) to collect all necessary information and cooperatively build the remittance transaction, including sending transaction, inter-manager transaction, and delivery transaction, to be sent to either ATT transaction node or FET transaction node of the distributed transaction consensus network, such as TBCA Network 100.

One approach to improve anonymity is to implement a novel interaction between the sender's digital property management module and the recipient's digital property management module so that, in the process of cooperatively building the remittance transaction, neither module will have access to both sender's virtual wallet ID and recipient's virtual wallet ID to trace a specific remittance transaction. For example, the sender's digital property management module has sender's mobile phone number, sender's virtual wallet ID, and recipient's mobile phone number (provided by sender), but has no access to recipient's virtual wallet ID. Similarly, the recipient's digital property management module has recipient's mobile phone number, recipient's virtual wallet ID, sender's mobile phone number (provided by sender's module), but has no access to sender's virtual wallet ID. As a result, a hacker which breaks in any digital property management module cannot obtain all necessary information to trace any specific remittance transaction.

FIG. 7 illustrates an embodiment in which the remittance transaction comprises three parts (each part constitutes a sub-transaction) to complete the payment transfer from William's virtual wallet to Steve's virtual wallet. At the end, Steve will receive 60 $USD.FET (digital US Dollars issued by FET). These 3 sub-transactions to complete the remittance transaction are collectively referred to as a transaction set. (Please note that each subtransaction can be considered as a transaction by the TBCA Network 100.) Before the remittance transaction, William's virtual wallet has 3 UTXOs, respectively at the amount of 4, 21, and 50 with type of $USD.ATT; ATT's virtual wallet has 3 UTXOs, respectively at the amount of 28, 36, and 66 with type of $USD.ATT; FET's virtual wallet has 3 UTXOs, respectively at the amount of 17, 48, and 123 with type of $USD.FET; and Steve's virtual wallet has 1 UTXO at the amount of 100 with type of $USD.FET. The sending transaction has two input UTXOs, 21 and 50 $USD.ATT selected from William's virtual wallet, and two output UTXOs, 60 $USD.ATT locked to ATT's virtual wallet and 11 $USD.ATT locked to William's virtual wallet (change back to William). The inter-manager transaction has one input UTXOs, 66 $USD.ATT selected from ATT's virtual wallet, and two output UTXOs, 60 $USD.ATT locked to FET's virtual wallet and 6 $USD.ATT locked to ATT's virtual wallet (change back to ATT). The delivery transaction has two input UTXOs, 17 and 48 $USD.FET selected from FET's virtual wallet, and two output UTXOs, 60 $USD.FET locked to Steve's virtual wallet and 5 $USD.FET locked to FET's virtual wallet (change back to FET). After all three subtransactions are propagated to a distributed transaction consensus network, such as TBCA Network 100, and committed, William's virtual wallet has 2 UTXOs, respectively at the amount of 4 and 11 with $USD.ATT type; ATT's virtual wallet has 4 UTXOs, respectively at the amount of 6, 28, 36, and 60 with $USD.ATT type; FET's virtual wallet has 3 UTXOs, respectively at the amount of 60 with $USD.ATT type and at the amount of 5 and 123 with $USD.FET type; Steve's virtual wallet has 2 UTXOs, respectively at the amount of 60 and 100 with $USD.FET type.

Figure 8:
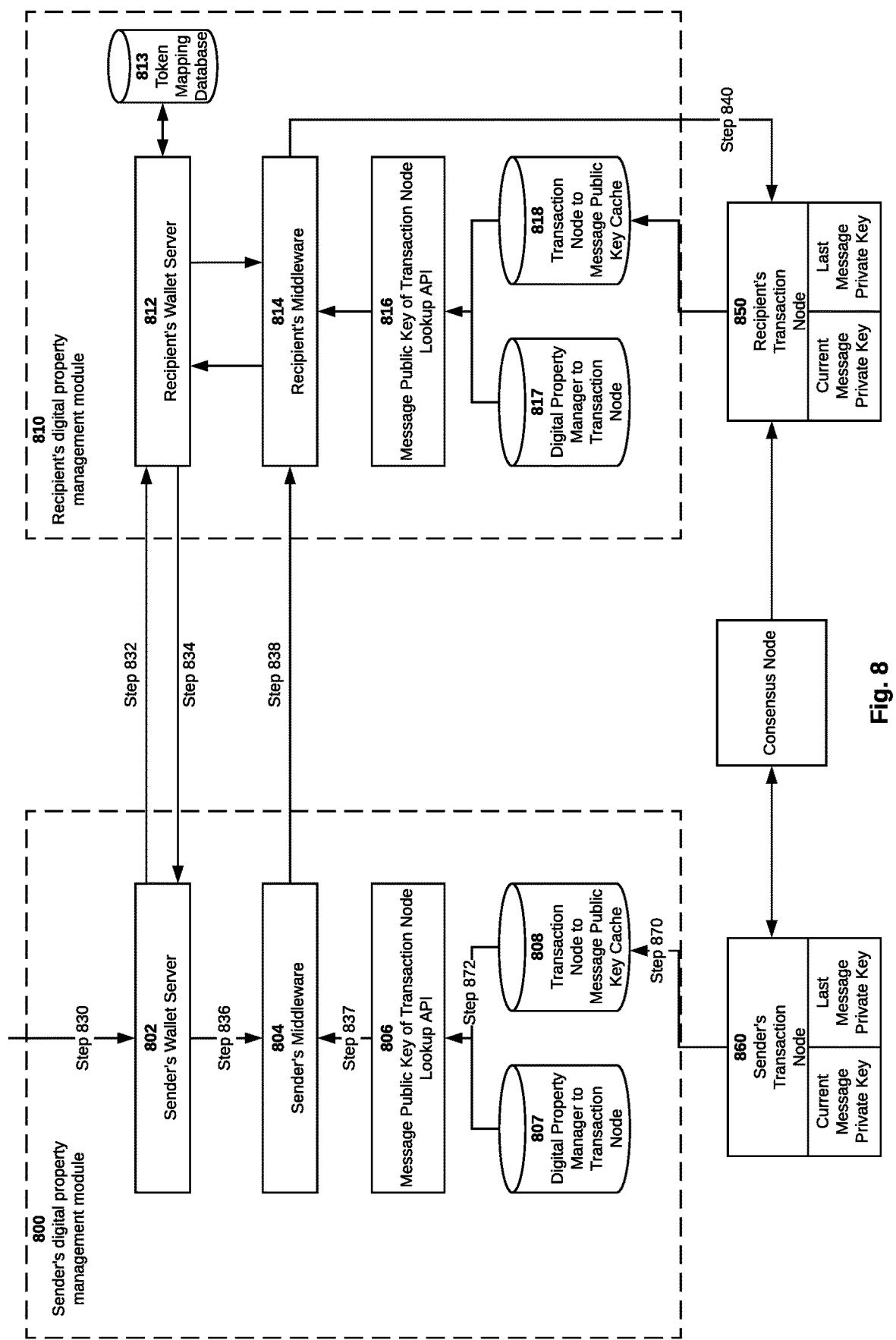
FIG. 8 is a schematic diagram illustrating an example of using a token to temporarily replace a recipient's virtual wallet address in a remittance transaction.

In one embodiment, as shown in FIG. 8, sender's digital property management module works cooperatively with recipient's digital property management module to receive sender's remittance request and convert it to a remittance transaction comprising three parts in an appropriate format for the distributed transaction consensus network, while maintaining the anonymity of the remittance transaction. The sender's digital property management module 800 comprises a sender's wallet server 802, a sender's middleware 804, its own pair of message public key and message private key, and a lookup API for retrieving a message public key of recipient's transaction node. The recipient's digital property management module 810 comprises a recipient's wallet server 812, a recipient's middleware 814, and its own pair of message public key and message private key.

The message public keys are shared with and accessible by other digital property management modules and the message private keys are kept confidential and only accessible by their owners. A message private key is used by a message sender (who is the key owner) to create a signature on messages for a message receiver (who is not the key owner) using the message public key to prove they are authentic messages which have not been altered. A message public key can be used by a message sender (who is not the key owner) to create encrypted messages so that only the intended message receiver (who is the key owner) can decrypt the messages to learn the contents by using the message private key.

In step 830 of FIG. 8, the sender's wallet server 802 receives a remittance request from the sender, e.g. William, for transferring an amount, e.g. 60 digital US Dollars, to the recipient, e.g. Steve. The remittance request includes at least (1) sender's physical identification, such as William's mobile phone number, (2) recipient's physical identification, such as Steve's mobile phone number, and the amount of digital property and its type for remittance. Sender's wallet server 802 may receive sender's virtual identification, William's virtual wallet ID, directly from the sender, or retrieve it from a data storage of sender's digital property management module.

In order to complete the remittance transaction, the distributed transaction consensus network needs recipient's virtual identification, Steve's virtual wallet ID. Since sender's digital property management module does not know who the recipient's digital property management module is, the recipient's physical identification, Steve's mobile phone number, has to be propagated to all other digital property management modules to locate the recipient's digital property management module and retrieve recipient's virtual identification, Steve's virtual wallet ID, for the transaction. To improve anonymity, sender's digital property management module is not allowed to have recipient's virtual wallet ID, thus, recipient's digital property management module has to send sender's digital property management module a token which eventually can be related to recipient's virtual wallet ID.

In step 832, sender's wallet server 802 sends a token request to wallet servers of all other digital property management modules, for example, operated by telecommunication carriers ("telcos"), to seek a token response from recipient's wallet server 812 because sender's wallet server does not know which digital property management module the recipient is associated with. For example, ATT does not know FET is the telco that Steve's mobile phone number is associated with. The token request can be sent directly to all other digital property management modules via an encrypted network. Alternatively, the token request can be broadcasted to a network including all other digital property management modules and rely on peer-to-peer gossip in order to reach the recipient's digital property management module and obtain a token response. In such a scheme, when an irrelevant digital property management module receiving a token request is not the recipient's digital property management module, it propagates the token request to all of its peers. If such irrelevant digital property management module receives a token response, it relays the token response back to the peer that sent the token request.

In one embodiment, the token request includes the identification of sender's digital property management module ("sender's module"), such as ATT, the recipient's physical identification, such as Steve's mobile phone number, and a signature created on the hash or raw data of both the identification of sender's module and the recipient's physical identification by using the message private key of sender's module. As a result, the recipient's digital property management module ("recipient's module") can verify the message (for example, ATT and Steve's mobile phone number) in the token request is authentic by using the message public key of sender's module and comparing the hash or raw data of the message.

After receiving the token request, recipient's module verifies the message is authentic and then confirms that the recipient is a subscriber by checking his/her physical identification, such as Steve's mobile phone number. Then, recipient's module generates a token and creates a token mapping that relates the token to recipient's virtual identification, such as Steve's virtual wallet ID. In one embodiment, a token can be a string randomly generated. To prevent an irrelevant digital property management module from intercepting the token and misusing it, in one embodiment, recipient's module further encrypts the token, or encrypts both the token and the identification of recipient's module, such as FET, using a message public key of sender's module. Thus, only sender's module can decrypt the token, using its own message private key. A token can mean an encrypted token or an unencrypted token.

In one embodiment, when a token is generated, a copy of the token is also placed in a valid token pool. After the delivery transaction which the token is used to construct is committed to a distributed ledger, it is removed from the valid token pool to prevent it from being used again. In another embodiment, a token includes a time stamp to indicate the time the token was generated. After a given period of time passes away, a token will be rejected and can no longer be used for constructing transactions.

In step 834, recipient's wallet server 812 sends a token response directly back to sender's wallet server 802. Alternatively, the token response is sent to a network that includes the wallet server of all other digital property management modules, and then is relayed back to the sender's wallet server by peer-to-peer gossip. The token response can include (1) identification of sender's digital property management module, e.g. ATT, (2) recipient's physical identification, e.g. Steve's mobile phone number, (3) both the token and identification of recipient's digital property management module (e.g. FET) encrypted by using the message public key of sender's digital property management module, and (4) a recipient's signature created on the above items (1)-(3) by using his/her message private key. The recipient's signature enables sender's digital property management module to verify the recipient' digital property manager and the authentication of the information in the above items (1)-(3) message to ensure it is not from a fake source and is not altered.

After receiving the token response, sender's digital property management module checks recipient's signature, using recipient's message public key to verify that the token response really comes from recipient's digital property management module which is the only module can sign on behalf of recipient. The sender's digital property management module also has to decrypt the encrypted token and identification of recipient's module, using its message private key to retrieve the message, such as the token and FET.

In step 836, after collecting all necessary information, sender's wallet server 802 provides the information to sender's middleware 804 to construct the remittance transaction for distributed transaction consensus network. In one embodiment, sender's middleware 804 tries to construct sending transaction, inter-manager transaction, and delivery transaction. To construct sending transaction, sender's middleware 804 selects one or more UTXOs from sender's virtual wallet based on the remittance amount, such as 21 and 50 $USD.ATT n FIG. 7. The sending transaction needs to be signed by sender's transaction private key. Sender's middleware sends it back to sender's wallet server 802 which interfaces with signing server to have sending transaction signed. The signing server then returns the signed sending transaction back to sender's wallet server 802, which returns it to sender's middleware 804. Similarly, to construct inter-manager transaction, sender's middleware 802 selects one or more UTXOs from the virtual wallet of sender's digital property manager, such as 66 $USD.ATT in FIG. 7. The inter-manager transaction also needs to be signed following the same or similar process to that of sending transaction. To construct delivery transaction, sender's middleware 802 uses the token to replace recipient's virtual wallet ID and constructs a temporary delivery transaction.

In step 837, sender's middleware 804 retrieves a message public key of recipient's transaction node from message public key of transaction node lookup API 806. Lookup API 806 needs to check information stored in two databases, digital property manager to transaction node cache 807 and transaction node to message public key cache 808 to pull out the message public key of recipient's transaction node. In order to improve anonymity, recipient's digital property management module is not allowed to have access to sender's virtual identification, such as virtual wallet ID. Thus, sender's digital property management module encrypts signed sending transaction by using the message public key of recipient's transaction node.

For security reason, a transaction node, such as 850, 860 will periodically generate a new key pair comprising message public key and message private key, submit it to the distributed transaction consensus network, and have it recorded to the distributed ledger. Whenever a new key pair is generated, the transaction node 850, 860 will push out the new message public key to the node to public key cache, such as 808, 818. The transaction node 850, 860 will save both the current message private key and last message private key in its memory.

In step 838, sender's middleware 804 of sender's digital property management module sends the encrypted sending transaction, the inter-manager transaction, and the temporary delivery transaction to recipient's middleware 814 of recipient's digital property management module. Recipient's digital property management module verifies the inter-manager transaction to confirm that the virtual wallet of recipient's digital property manager will receive a fund transfer from the virtual wallet of sender's digital property manager. Recipient's module 810 retrieves recipient's virtual identification, such as Steve's virtual wallet ID, by using the token and the token mapping database 813, to convert the temporary delivery transaction to a normal one. Recipient's digital property management module will also verify whether the token is still in a valid token pool before it constructs the delivery transaction and removes the token from the valid token pool after the delivery transaction is committed by the distributed transaction consensus network. As a result, a token will not be re-used. Recipient's module 810 also has to select one or more UTXOs from the virtual wallet of recipient's digital property manager, such as 17 and 48 $USD.FET in FIG. 7 and have it signed by using a transaction private key of the virtual wallet of recipient's digital property manager following the same or similar process to that of sending transaction.

In step 840, recipient's middleware 814 sends the encrypted sending transaction, inter-manager transaction, and delivery transaction to recipient's transaction node 850. Recipient's transaction node 850 decrypts the encrypted sending transaction, by using its current message private key. If the current message private key does not work, recipient's transaction node 850 will use its last message private key for decryption. After decryption, recipient's transaction node 850 propagates the sending transaction, inter-manager transaction, and delivery transaction to other nodes of the distributed transaction consensus network.

Figure 9:
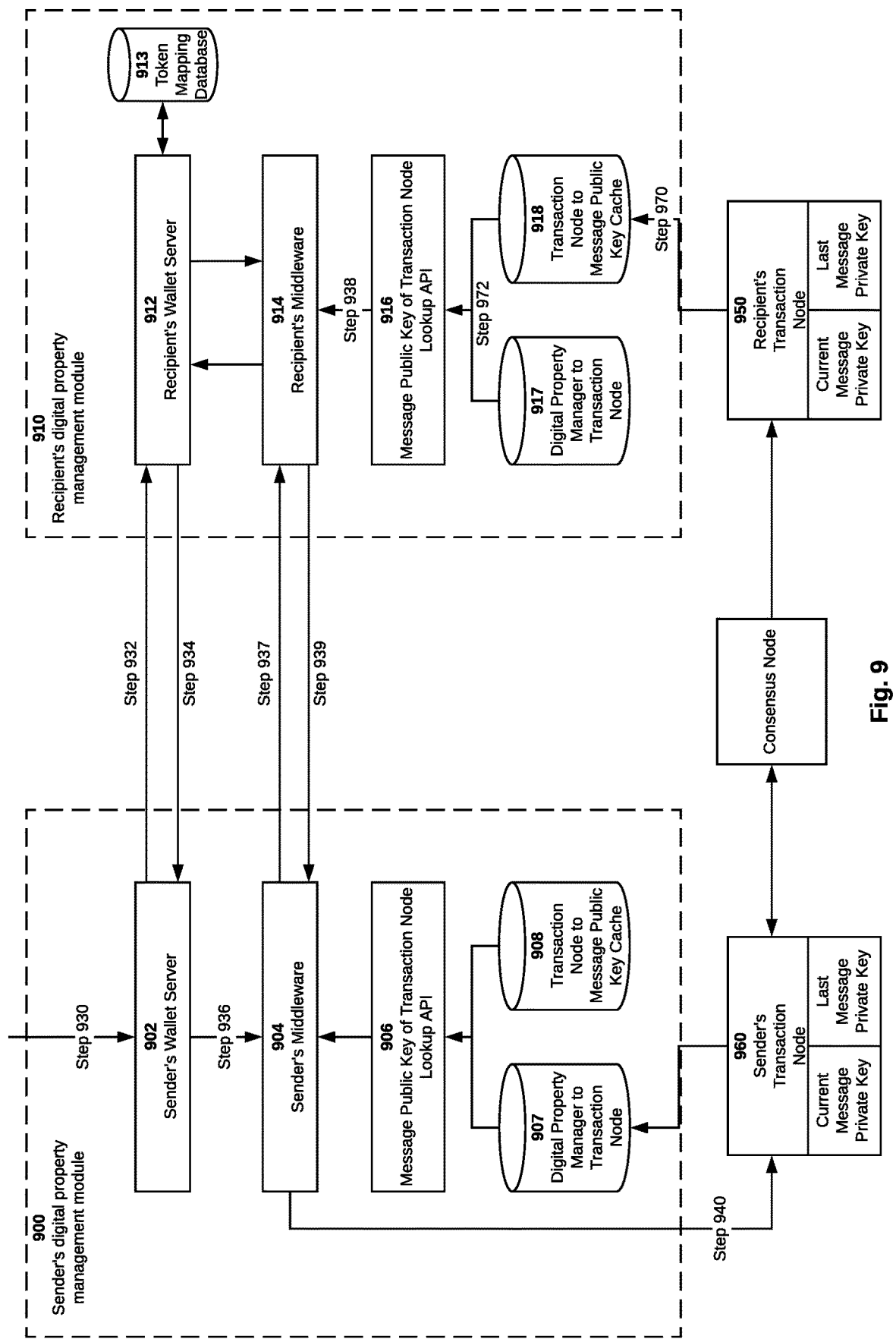
FIG. 9 is a schematic diagram illustrating another example of using a token to temporarily replace a recipient's virtual wallet address in a remittance transaction FIG. 10 are tables illustrating an example of a remittance transaction whose delivery transaction comprises two sub-transaction.

Unlike the processes shown in FIG. 8, in which recipient's middleware 814 sends all of the sending transaction, the inter-manager transaction, and the delivery transaction to recipient's transaction node, in another embodiment as shown in FIG. 9, sender's middleware sends all 3 sub-transactions to sender's transaction node. Steps 930, 932, 934, and 936 are respectively the same as steps 830, 832, 834, and 836 as shown in FIG. 8. In step 937, sender's middleware 904 sends recipient's middleware 914 the inter-manager transaction and the temporary delivery transaction. Recipient's digital property management module verifies the inter-manager transaction to confirm that the virtual wallet of recipient's digital property manager will receive a fund transfer from the virtual wallet of sender's digital property manager. Then, recipient's module converts the temporary delivery transaction to a normal one by using the token and the token mapping database 913.

In step 938, recipient's middleware 914 retrieves a message public key of sender's transaction node from message public key of transaction node lookup API 916. Lookup API 916 needs to check information stored in two databases, digital property manager to transaction node cache 917 and transaction node to message public key cache 918 to pull out the message public key of sender's transaction node. In order to improve anonymity, sender's digital property management module is not allowed to have access to recipient's virtual identification, such as virtual wallet ID. Thus, recipient's digital property management module encrypts signed delivery transaction by using the message public key of sender's transaction node.

In step 939, recipient's middleware 914 of recipient's digital property management module sends the encrypted delivery transaction to sender's middleware 904 of sender's digital property management module.

In step 940, sender's module sends the sending transaction, inter-manager transaction, and encrypted delivery transaction to sender's transaction node. Sender's transaction node decrypts the encrypted delivery transaction by using its current message private key. If it does not work, sender's transaction node will try to use its last message private key. After decryption, sender's transaction node then propagates all of the sending transaction, inter-manager transaction, and delivery transaction to the distributed transaction consensus network.

In a third embodiment, the first 5 steps are the same as steps 930, 932, 934, 936, 937 of the second embodiment. Recipient's digital property management module verifies the inter-manager transaction to confirm that the virtual wallet of recipient's digital property manager will receive a fund transfer from the virtual wallet of sender's digital property manager. Then, recipient's module converts the temporary delivery transaction to a normal one by using the token and the token mapping database. Then sender's module sends the sending transaction to sender's transaction node. Recipient's module sends the inter-manager transaction and the delivery transaction to the recipient's transaction node. Neither sending transaction nor delivery transaction has to be encrypted. Both sender's transaction node and recipient's transaction node propagate the transactions to the distributed transaction consensus network.

The above two embodiments provide processes to assure sender's module does not have access to recipient's virtual identification, such as Steve's virtual wallet ID, and recipient's module does not have access to sender's virtual identification, such as William's virtual wallet ID. As a result, the anonymity is substantially increased because either sender's module or recipient's module is unlikely to trace and connect all three of the sending transaction, the inter-manager transaction, and the deliver transaction recorded in the distributed ledger to reconstruct a remittance transaction. However, if someone having a copy of the distributed ledger carefully analyzes each sub-transaction, it may still be possible to connect 3 sub-transactions in a remittance transaction set by matching the amount of digital property intended to be transferred. For example, as shown in FIG. 7, ATT knows William transferred 60 digital US Dollars to ATT's virtual wallet in the sending transaction and ATT's virtual wallet transferred 60 digital US Dollars to FET's virtual wallet in the inter-manager transaction. Then, if ATT tries to match a recipient who received 60 digital US dollars from FET in the same or adjacent block, it may discover Steve's virtual wallet ID and be able to re-construct all 3 sub-transactions.

To further improve the anonymity, one or more of the sending transaction, inter-manager transaction, and delivery transaction can be further split into two or more sub-transactions. For example, the delivery transaction can be broken into first delivery transaction and second delivery transaction, each of which has a different amount to be transferred but the sum is the same as the original delivery transaction. In this situation, 4 sub-transactions have to be connected to re-construct one remittance transaction. Similarly, the sending transaction can be further split into two or more sub-transactions, such as first sending transaction, second sending transaction, and third sending transaction. By using this approach, a hacker who has access to sender's module, recipient's module, and/or the distributed ledger cannot easily match the amount to be transferred of the sub-transactions to reconstruct the remittance transaction.

In a fourth embodiment as shown in FIG. 10, while the sending transaction and the inter-manager transaction remains the same as those in FIG. 7, the delivery transaction is further broken into the first delivery transaction and the second delivery transaction. The first delivery transaction has one input UTXO, 17 $USD.FET, and one output UTXO, 17 $USD.FET locked to Steve's virtual wallet. The second delivery transaction has one input UTXO, 48 $USD.FET, and two output UTXOs, 43 $USD.FET locked to Steve's virtual wallet and 5 $USD.FET (change) locked to FET's virtual wallet. Given that the amount to be transferred in sub-transactions do not match each other and, in some situation, sender's module may not be aware of the total number of sub-transactions, a hacker would be unable to reconstruct the remittance transaction.

In another alternative to increase anonymity, the amount of input digital property can be broken into a plurality of fragments at base amounts and each fragment constitutes a separate sub-transaction. A distributed transaction consensus network, transaction nods, or digital property management modules can determine the base amounts of digital properties, such as UTXOs, to be issued. For example, the base amounts can be 5, 10, 20, 50, 100, 200, 500, etc. Thus, a plurality of UTXOs at base amounts can be used as an input UTXO of multiple sub-transactions, for either sending transaction, inter-manager transaction, or delivery transaction. In particular, splitting the inter-manager transaction into a plurality of sub-transactions at base amounts will make tracing a remittance transaction more difficult.

To balance anonymity of transactions and the efficiency of performance, the amount to be transferred can only be broken into a limited number of fragments. People with ordinary skill in the art can use various algorithms trying to optimize the division of the amount to be transferred into several fragments at base amounts. In some situations, if a UTXO at a specific base amount is not available, a larger amount UTXO can be used. In other words, to achieve better performance, the sum of the fragments can be larger than the amount to be transferred and a change of the difference can be returned to the sending virtual wallet. For example, the amount to be transferred of $368.46 can be broken into one $200, one $100, one $50, and one $20. A change of $1.54 can be returned to the sender.

In a fifth embodiment as shown in FIG. 11, William wants to send 16 digital US Dollars to Steve. The sending transaction has one input UTXO, 20 $USD.ATT, and three output UTXOs which are respectively 10 $USD.ATT locked to ATT's virtual wallet, 6 $USD.ATT locked to ATT's virtual wallet, and 4 $USD.ATT (change) locked to William's virtual wallet. The inter-manager transaction comprises 3 sub-transactions. The first inter-manager transaction has one input UTXO, 10 $USD.ATT, and one output UTXO, 10 $USD.ATT locked to FET's virtual wallet. The second inter-manager transaction has one input UTXO, 5 $USD.ATT, and one output UTXO, 5 $USD.ATT locked to FET's virtual wallet. The third inter-manager transaction has one input UTXO, 5 $USD.ATT and two output UTXOs, 1 $USD.ATT locked to FET's virtual wallet and 4 $USD.ATT (change) locked to ATT's virtual wallet. The delivery transaction comprises 2 sub-transactions. The first delivery transaction has one input UTXO, 10 $USD.FET and one output UTXO, 10 $USD.FET locked to Steve's virtual wallet. The second delivery transaction has one input UTXO, 10 $USD.FET and two output UTXOs, 6 $USD.FET locked to Steve's virtual wallet and 4 $USD.FET (change) locked to FET's virtual wallet. As a result, this remittance transaction of 16 digital US Dollars from William to Steve comprises 6 sub-transactions. All 6 sub-transactions have to be validated or failed at the same time. (Please note that each sub-transaction can be considered as a transaction by the TBCA Network 100.)

Various measures described above can be applied alone or in combination to increase anonymity of the transactions. However, to prevent the distributed transaction consensus network, TBCA Network 100, from becoming a money laundering facilitator, it is necessary for the digital property management system to be able to trace specific digital property transactions. In order to increase traceability, when a remittance transaction comprises a plurality of sub-transactions (in a set), a label is created to identify and specify the sequence of each sub-transaction in the same remittance transaction set. In one embodiment, a remittance transaction comprises three sub-transactions (one sending transaction, one inter-manager transaction, and one delivery transaction), each of which is given a label to show that they belong to a specific remittance transaction set and their sequence in the set. The label is then encrypted by a tracing key. In one embodiment, the label is encrypted and only the administrator 110 (TBCA) has the tracing private key to identify the three sub-transactions in the same remittance transaction set to reconstruct the set and trace virtual wallets and the amount in connection to a specific transaction.

In one embodiment, either sender's module or recipient's module can generate a human readable (and computer parsable) label for each sub-transaction, such as {set}_1_{nonce}, {set}_2_{nonce}, and {set}_3_{nonce} where {set} is a transaction set number such that all sub-transactions within a remittance transaction set share the same transaction set number, and where {nonce} is some large random number. A new nonce has to be generated before a digital property management module uses up all the set numbers, but can be generated as often as needed, e.g. each block can have a different nonce. In one embodiment, the middleware of sender's module can randomly generate and hold a nonce "n" (if it hasn't generated one, or if it has run out of possible set numbers for the nonce it already has). Likewise, the middleware should also hold a set number {set}, which is incremented by 1 each time after the middleware labels a remittance transaction set. The set number can be reset to 0 whenever a new nonce is generated. In one embodiment, the set field size can be selected in light of the usage of encryption algorithm, e.g. AES symmetric key algorithm. The nonce part of the label can be about 24 bytes.

In one embodiment, each label is then encrypted by AES symmetric algorithm with a 256 bit key (https://en.wikipedia.org/wiki/Advanced_Encryption_Standard) to generate seemingly random and different strings. Other encryption algorithms, such as RSA, can be used. In fact, people with ordinary skill in the art can select any encryption algorithm which can balance security and performance needs. Under the symmetric encryption scheme, TBCA 110 would keep at least 1 symmetric key per digital property management module, and each module would hold its own symmetric key to encrypt the labels for sub-transactions in remittance transaction sets. Each sub-transaction within a remittance transaction set will then include a transaction set field with its encrypted label, one of these random-appearing strings, and be recorded in the blockchain. In one embodiment where the remittance transaction comprises 6 sub-transactions, T1, T2, T3, T4, T5, and T6, in one remittance transaction set, AES(TracingKey, Label) is our encryption algorithm when a symmetric tracing key is used. In another embodiment, a tracing public key of an asymmetric key pair can be used for encrypting labels. Labels of the 9 sub-transactions are generated: x_1_n, x_2_n, . . . , x_9_n (x is transaction set number and n is nonce), and then encrypted by using either a symmetric tracing key or a tracing public key (asymmetric). Then these encrypted labels are inserted into the Transaction Set field for each sub-transaction in the remittance transaction set. Then, x is incremented by 1, unless x already reaches its maximum value. If x is at its maximum value, x is reset to 0 and a new n is generated. As shown in FIG. 12, each sub-transaction includes a new field named "Transaction Set" to store the encrypted label. (Please note that each sub-transaction can be considered as a transaction in the TBCA Network 100.)

In order to recover the remittance transaction sets, assume Tn transactions in a block, with encrypted labels Ln, and AES'(TracingKey, Ln)=L'n is our decryption algorithm: (1) For each Ln, find AES'(TracingKey, Ln)=L'n; (2) L'n will be of form {set}_(1, 2, 3, 4, 5, or 6)_{nonce}; (3) all transactions with the same set number are in the same remittance transaction.

When an asymmetric tracing key is used, because a digital property manager, including its digital property management module and transaction nodes, such as telecommunication carriers ("telco"), does not have the tracing private key, the digital property manager cannot recover the encrypted labels in remittance transaction sets to trace specific remittance transactions. With the tracing private key, when necessary, the administrator, TBCA 110, or an authorized/assigned node of the distributed transaction consensus network can recover and trace a specific transaction to identify a sender's virtual wallet ID, a recipient's virtual wallet ID, and the amount and type of digital property transferred. When a symmetric key is used, each digital property manager can decrypt the sub-transactions for which it provides the encrypted labels, but the network administrator can decrypt all the sub-transactions because the network administrator has a copy of the tracing key each digital property management module uses. To really identify the sender and the recipient in a real world, a network administrator still needs to work with digital property managers who can connect a virtual wallet ID with its subscriber's telephone number or other physical identification, such as social security number.

Below are sample pseudo codes for the embodiments described above with respect to anonymity and traceability.

```
Telco Module Function:
Function SendRemittance(FromMsn, ToMsn, Asset)
    TokenRequest = ConstructTokenRequest(ToMsn)
    For All Peer Telcos:
    If Not Empty Peer.RelayTokenRequest(TokenRequest)
            (Token, TargetTelco) = This.TelcoPrivateKey.Decrypt(Not Empty
        Peer.TelcoRelayTokenRequest(TokenRequest).EncryptedData)
    ReceivingNodePublicKey = LookupNodePublicKey(TargetTelco)
    SendingTxn = ReceivingNodePublicKey.Encrypt(ConstructSendingTxn(FromMsn,
Asset))
    InterManageeTxn = ConstructInterManageeTxn(FromMsn, ToMsn, Asset)
    DeliveryTxn = ConstructDeliveryTxn(Token, Asset)
    SignTxns([SendingTxn, InterManageeTxn])
    TargetTelco.ReceiveTxns(SendingTxn, InterManagerTxn, DeliveryTxn)
Function ConstructTokenRequest(toMsn)
    TokenRequest.SendingTelco = GetTelcoFor(toMsn)
    TokenRequest.Msn = toMsn
        TokenRequest.Signature =
    This.TelcoPrivateKey.Sign(TokenRequest.SendingTelco, TokenRequest.Msn)
    Return TokenRequest
Function RelayTokenRequest(TokenRequest)
    If IsValid(TokenRequest) And IsNew(TokenRequest)
        If OwnsMsn(TokenRequest.Msn)
            Token = CreateToken(TokenRequest.Msn)
            MapToken(Token, TokenRequest.Msn)
            TokenResponse = CreateTokenResponse(TokenRequest)
            Return TokenResponse
        Else
            For All Peer Telcos:
                If Not Empty Peer.RelayTokenRequest(TokenRequest)
                    Return Not Empty Peer.RelayTokenRequest(TokenRequest)
    Else Return Empty TokenResponse
Function CreateTokenResponse(TokenRequest)
    TokenResponse.Msn = TokenRequest.Msn
    TokenResponse.SendingTelco = TokenRequest.SendingTelco
        TokenResponse.EncryptedData =
    GetPublicKeyFor(TokenRequest.SendingTelco).Encrypt( Token, This.Telco)
        TokenResponse.Signature = This.TelcoPrivateKey.Sign(TokenResponse.Msn,
    TokenResponse.SendingTelco, TokenResponse.EncryptedData)
    Return TokenResponse
```

-continued

```
Function ReceiveTxns(SendingTxn, InterManagerTxn, DeliveryTxn)
    ReplaceTokenFromMap(DeliveryTxn)
    SignTxns([DeliveryTxn])
    (LabelA, LabelB, LabelC) = CreateLabelSet( )
    ApplyLabel(LabelA, SendingTxn)
    ApplyLabel(LabelB, InterManagerTxn)
    AppyLabel(LabelC, DeliveryTxn)
    Ledger.SubmitTxns(SendingTxn, InterManagerTxn, DeliveryTxn)
Property SetNumber initialized at 0
Property Nonce initialized at Random( )
Function CreateLabelSet( )
    LabelA = TBCAPublicKey.Encrypt(SetNumber, Nonce, 1)
    LabelB = TBCAPublicKey.Encrypt(SetNumber, Nonce, 2)
    LabelC = TBCAPublicKey.Encrypt(SetNumber, Nonce, 3)
    If SetNumber = Maximum Set Number
        SetNumber = 0
        Nonce = Random( )
    Else
        SetNumber++
    Return LabelA, LabelB, LabelC
Function TxnFromLedger(Txn)
    If Txn is a KeyUpdateTxn
        UpdateNodePublicKey(Txn)
Node Functions:
Property CurrentPrivateKey
Property LastPrivateKey
Function RotateKeys( )
    (PublicKey, PrivateKey) = CreateNewKeypair( )
    (CurrentPrivateKey, LastPrivateKey) = (PrivateKey, CurrentPrivateKey)
    KeyUpdateTxn = CreateKeyUpdateTxn(PublicKey)
    BroadcastTxns([KeyUpdateTxn])
Function SubmitTxns(SendingTxn, InterManagerTxn, DeliveryTxn)
    If CurrentPrivateKey.Decrypt(SendingTxn) || LastPrivateKey.Decrypt(SendingTxn)
        BroadcastTxns([SendingTxn, InterManagerTxn, DeliveryTxn])
    Else
        Reject Txns
****************************************************************************
```

TABLE 1

Glossary of terms used in the pseudo code.

| Terms used in the pseudo code | Terms used in the Detailed Description section |
|---|---|
| SendRemittance | remittance request |
| FromMsn (Sender's mobile subscription number) | Sender's physical identification |
| ToMsn (recipient's mobile subscription number) | Recipient's physical identification |
| Asset | Amount and type of digital property to be remitted from sender to recipient |
| SendingTelco | Sender's digital property management module |
| TargetTelco | Recipient's digital property management module |
| TelcoPrivateKey | message private key of digital property management module |
| ReceivingNodePublicKey | message public key of recipient's transaction node |
| TelcoPrivateKey | Message private key of digital property management module |
| TBCAPublicKey | Administrator's tracing publickey |
| Txn | transaction |

It will be apparent to those skilled in the art that various modification and variations can be made in the methods and related apparatus and systems of the present invention without departing from the spirit or scope of the invention. Thus, it is intended that the present invention cover modifications and variations that come within the scope of the appended claims and their equivalents.

The invention claimed is:

1. A method implemented in a digital property management system, the digital property management system comprising a sender's digital property manager and a recipient's digital property manager different from the sender's digital property manager, the sender's digital property manager comprising a sender's transaction node and a sender's digital property management module including at least one server to manage a sender's virtual wallet with the sender's digital property manager and process transactions, the recipient's digital property manager comprising a recipient's transaction node and a recipient's digital property management module including at least one server to manage a recipient's virtual wallet with the recipient's digital property manager and process transactions, wherein the sender's transaction node and the recipient's transaction node are two of multiple nodes of a distributed transaction consensus network, the method comprising:

(a) receiving, by the sender's digital property management module, a remittance request comprising a recipient's physical identification, for a remittance transaction comprising a sending transaction, an inter-manager transaction and a delivery transaction;

(b) receiving, from the sender's digital property management module, by the recipient's digital property management module, a token request comprising the recipient's physical identification;

(c) creating, by the recipient's digital property management module, a token and a token mapping that relates the token to a virtual identification of the recipient's virtual wallet;

(d) sending, from the recipient's digital property management module, to the sender's digital property management module, a token response comprising the token;

(e) constructing, by the sender's digital property management module, the sending transaction having a virtual identification of the sender's virtual wallet, the inter-manager transaction, and a temporary delivery transaction having the token, and sending the temporary delivery transaction to the recipient's digital property management module;

(f) converting, by the recipient's digital property management module, the temporary delivery transaction into the delivery transaction comprising the virtual identification of the recipient's virtual wallet retrieved by using the token and the token mapping; and (g) sending, by the sender's digital property management module, the sending transaction, the inter-manager transaction, and an encrypted delivery transaction from the recipient's digital property management module, to the sender's transaction node, which decrypts the encrypted delivery transaction to the delivery transaction, or sending, by the recipient's digital property management module, an encrypted sending transaction, and the inter-manager transaction, both from the sender's digital property management module, and the delivery transaction, to the recipient's transaction node, which decrypts the encrypted sending transaction to the sending transaction, wherein the encrypted delivery transaction and the encrypted sending transaction are generated by a symmetric key algorithm or an asymmetric key algorithm;

(h) recording, by the sender's transaction node or the recipient's transaction node, the sending transaction, the inter-manager transaction, and the delivery transaction in the distributed transaction consensus network;

wherein the sending transaction transfers first digital property issued by the sender's digital property manager from the sender's virtual wallet to a virtual wallet of the sender's digital property manager; the inter-manager transaction transfers a digital property from the virtual wallet of sender's digital property manager to the virtual wallet of recipient's digital property manager; and the delivery transaction transfers second digital property issued by the recipient's digital property manager from a virtual wallet of the recipient's digital property manager to the recipient's virtual wallet, wherein the first digital property and the second digital property have an identical monetary value.

2. The method of claim 1, wherein
the token request further comprises a sender's digital property management module's signature which is created on the recipient's physical identification by using a message private key of the sender's digital property management module; or
the token request further comprises a sender's digital property management module's identification and a sender's digital property management module's signature which is created on both the identification of the sender's digital property management module and the recipient's physical identification by using the message private key of the sender's digital property management module.

3. The method of claim 2, wherein step (b) further comprises
verifying, by the recipient's digital property management module, that information in the received token request is authentic, by using a message public key of the sender's digital property management module.

4. The method of claim 1, wherein the recipient's physical identification is a recipient's telephone number.

5. The method of claim 1, wherein the token response further comprises an identification of the recipient's digital property management module and a recipient's signature which is created on the token only or on both the identification of the recipient's digital property management module and the token, by using a recipient's message private key.

6. The method of claim 1, wherein the token response comprises an encryption of both the token and an identification of the recipient's digital property management module created by using a message public key of the sender's digital property management module.

7. The method of claim 6, wherein the token response further comprises the recipient's physical identification, an identification of the sender's digital property management module, and a recipient's signature which is created on the recipient's physical identification, the identification of the sender's digital property management module, and the encryption of both the token and the identification of the recipient's digital property management module, by using a recipient's message private key.

8. The method of claim 1, wherein the token further comprises a time stamp.

9. The method of claim 1, wherein the recipient's digital property management module verifies that the token is in a valid token pool before constructing the delivery transaction, and removes the token from the valid token pool after the delivery transaction is committed by the distributed transaction consensus network.

10. The method of claim 1, wherein in step (g),
the encrypted sending transaction is decrypted by using the message private key of the recipient's transaction node.

11. The method of claim 10, wherein the recipient's transaction node recurrently generates a new pair of message public key and message private key, and shares the public key with the digital property management modules of the sender and the recipient.

12. The method of claim 11, wherein step (g) comprises
(g1) decrypting the encrypted sending transaction by a current message private key stored in the recipient's transaction node; and
(g2) if step (g1) fails, decrypting the encrypted sending transaction by a last message private key stored in the recipient's transaction node.

13. The method of claim 1, wherein the recipient's digital property management module verifies that the token is in a valid token pool before constructing the delivery transaction, and removes the token from the valid token pool after the delivery transaction is committed by the distributed transaction consensus network.

14. The method of claim 1, wherein in step (g),
the encrypted delivery transaction is decrypted by the message private key of the sender's transaction node.

15. The method of claim 14, wherein the sender's transaction node recurrently generates a new pair of message public key and message private key, and shares the message public key with the digital property management modules of the sender and the recipient.

16. The method of claim 15, wherein step (g) comprises:
(g1) decrypting the encrypted delivery transaction by using a current message private key stored in the sender's transaction node; and
(g2) if step (g1) fails, decrypting the encrypted delivery transaction by using a last message private key stored in the sender's transaction node.

17. The method of claim 1, wherein the inter-manager transaction transfers third digital property issued by the sender's digital property manager from the virtual wallet of the sender's digital property manager to the virtual wallet of the recipient's digital property manager and the first digital property, the second digital property, and the third digital property have an identical monetary value.

18. The method of claim 1, wherein the sender's virtual wallet only stores digital properties issued by the sender's digital property manager, including the first digital property, the recipient's virtual wallet only stores digital properties issued by the recipient's digital property manager, including the second digital property.

* * * * *